(12) United States Patent
Machida (10) Patent No.: US 11,874,123 B2
(45) Date of Patent: Jan. 16, 2024

(54) ROUTE PLANNING APPARATUS, ROUTE PLANNING METHOD, AND COMPUTER-READABLE RECORDING MEDIUM

(71) Applicant: NEC Corporation, Tokyo (JP)

(72) Inventor: Manao Machida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 161 days.

(21) Appl. No.: 17/426,825

(22) PCT Filed: Feb. 1, 2019

(86) PCT No.: PCT/JP2019/003753
§ 371 (c)(1),
(2) Date: Jul. 29, 2021

(87) PCT Pub. No.: WO2020/157990
PCT Pub. Date: Aug. 6, 2020

(65) Prior Publication Data
US 2022/0120575 A1     Apr. 21, 2022

(51) Int. Cl.
*G01C 21/34*     (2006.01)
*G08G 1/0968*    (2006.01)

(52) U.S. Cl.
CPC ....... *G01C 21/3453* (2013.01); *G08G 1/0968* (2013.01)

(58) Field of Classification Search
CPC .......... G01C 21/3453; G01C 21/34; G01C 21/3415; G01C 21/3446; G01C 21/3484; G08G 1/0968; G05D 1/0212
See application file for complete search history.

(56) References Cited

U.S. PATENT DOCUMENTS

| 2005/0251325 A1* | 11/2005 | Kudo | G01C 21/3484 |
| | | | 235/472.01 |
| 2011/0098912 A1 | 4/2011 | Baselau et al. | |
| 2018/0095471 A1* | 4/2018 | Allan | G05D 1/0088 |

FOREIGN PATENT DOCUMENTS

| JP | H10-312217 A | 11/1998 |
| JP | 2002-133351 A | 5/2002 |
| JP | 3722229 B2 | 11/2005 |
| JP | 2011-526679 A | 10/2011 |
| JP | 2017-134794 A | 8/2017 |

(Continued)

OTHER PUBLICATIONS

International Search Report for PCT Application No. PCT/JP2019/003753, dated May 14, 2019.

(Continued)

*Primary Examiner* — Bao Long T Nguyen
(74) *Attorney, Agent, or Firm* — Sughrue Mion, PLLC (57) ABSTRACT

A route planning apparatus 1 includes a state information generation unit 2 configured to generate, every unit time, state information indicating a state of each moving object 20, in a search for a first route to a target site corresponding to the moving object 20, a stop unit 3 configured to stop generation of the state information when a condition for stopping generation of the state information is satisfied, and a route searching unit 4 configured to search for a second route to the target site, based on the state information generated before the state transitioned, after generation of the state information is stopped.

9 Claims, 9 Drawing Sheets

(56) References Cited

FOREIGN PATENT DOCUMENTS

JP          2019-007832  A       1/2019

OTHER PUBLICATIONS

Trevor Standley, "Finding Optimal Solutions to Cooperative Pathfinding Problems", [online], AAAI, 2010, [Accessed on Nov. 21, 2018], <URL:https://pdfs.semanticscholar.org/2529/f40c4f79ef24165dbb1a8327770e37cced2d.pdf>.

Guni Sharon, Roni Stern, Ariel Felner, Nathan Sturtevant, Conflict-Based Search For Optimal Multi-Agent Path Finding, [online], AAAI, 2010, [Accessed on Nov. 21, 2018], <URLhttps://www.aaai.org/ocs/index.php/AAAI/AAAI12/paper/viewFile/5062/5239>.

English translation of Written opinion for PCT Application No. JP2019/003753 dated May 14, 2019.

Japanese Office Communication for JP Application No. 2020-569336 dated Jan. 24, 2023 with English Translation.

* cited by examiner

STATE0

STATE1

STATE2

STATE3

ROUTE PLANNING APPARATUS, ROUTE PLANNING METHOD, AND COMPUTER-READABLE RECORDING MEDIUM

This application is a National Stage Entry of PCT/JP2019/003753 filed on Feb. 1, 2019, the contents of all of which are incorporated herein by reference, in their entirety.

TECHNICAL FIELD

The present invention relates to a route planning apparatus and a route planning method for performing a route planning, and further relates to a computer-readable recording medium that includes a program recorded thereon for realizing the apparatus and method.

BACKGROUND ART

Conventionally, Automated Guided Vehicles (AGVs) have been introduced in various plants to improve work efficiency, production efficiency, and the like. AGVs have been introduced in various logistics facilities as well to realize work efficiency improvement, quick delivery, and the like.

Non-patent documents 1 and 2 disclose optimization algorithms for obtaining a route plan such that a plurality of AGVs do not collide with each other. For example, Non-patent document 1 discloses the A*+OD (A-Star with Operator Decomposition) algorithm. Also, Non-patent document 2 discloses the CBS (Conflict-Based Search) algorithm.

LIST OF RELATED ART DOCUMENTS

Non-Patent Document

Non-Patent Document 1: Trevor Standley, "Finding Optimal Solutions to Cooperative Pathfinding Problems", [online], AAAI, 2010, [Accessed on Nov. 21, 2018], <URL: https://pdfs.semanticscholar.org/2529/f40c4f79ef24165dbb1a8327770e37cced2d.pdf>

Non-Patent Document 2: Guni Sharon, Roni Stern, Ariel Felner, Nathan Sturtevant, "Conflict-Based Search For Optimal Multi-Agent Path Finding, [online], AAAI, 2010, [Accessed on Nov. 21, 2018], <URL: https://www.aaai.org/ocs/index.php/AAAI/AAAI12/paper/viewFile/5062/5239>

SUMMARY

Technical Problems

However, the optimization algorithms disclosed in Non-patent documents 1 and 2 are NP-hard (NP-hardness: Non-deterministic Polynomial-time hardness) for problems such as minimizing the total movement time taken for all the AGVs to arrive at respective target sites.

In other words, the optimization algorithms disclosed in Non-patent documents 1 and 2 require a long calculation time to obtain the optimal route plan. For this reason, the optimization algorithms disclosed in Non-patent documents 1 and 2 are not practical.

An example object of the invention is to provide a route planning apparatus, a route planning method, and a computer-readable recording medium, according to which a route can be obtained even if calculation of a route plan is stopped partway through the calculation.

Solution to the Problems

In order to achieve the above example object, a route planning apparatus according to an example aspect of the invention includes:
a state information generation unit configured to generate, every unit time, state information indicating a state of each moving object, in a search for a first route to a target site corresponding to the moving object;
a stop unit configured to stop generation of the state information when a condition for stopping generation of the state information is satisfied; and
a route searching unit configured to search for a second route to the target site, based on state information before the state transitioned, after generation of the state information is stopped.

In order to achieve the above example object, a route planning method according to an example aspect of the invention includes:
generating, every unit time, state information indicating a state of each moving object, in a search for a first route to a target site corresponding to the moving object;
stopping generation of the state information when a condition for stopping generation of the state information is satisfied; and
searching for a second route to the target site, based on the state information generated before the state transitioned, after generation of the state information is stopped.

Further, in order to achieve the above example object, a computer-readable recording medium according to one aspect of the invention includes a program recorded thereon, the program including instructions that cause a computer to carry out:
generating, every unit time, state information indicating a state of each moving object, in a search for a first route to a target site corresponding to the moving object;
stopping generation of the state information when a condition for stopping generation of the state information is satisfied; and
searching for a second route to the target site, based on the state information generated before the state transitioned, after generation of the state information is stopped.

Advantageous Effects of the Invention

As described above, according to the invention, a route can be obtained even if calculation of a route plan is stopped in the middle of the calculation.

EXAMPLE EMBODIMENTS

Example Embodiment

Hereinafter, an example embodiment of the invention will be described with reference to FIGS. 1 to 9.

Apparatus Configuration

Figure 1:
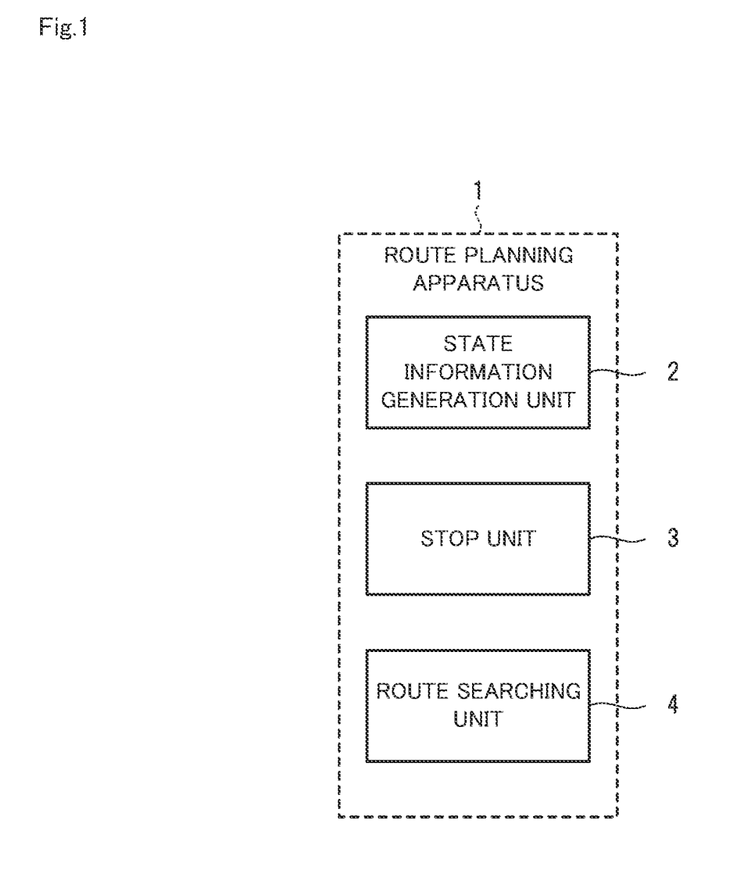
FIG. 1 is a diagram showing an example of a route planning apparatus.

First, a configuration of a route planning apparatus 1 according to the example embodiment will be described using FIG. 1. FIG. 1 is a diagram showing an example of a route planning apparatus.

The route planning apparatus 1 shown in FIG. 1 is an apparatus that can obtain a route even if calculation of a route plan is stopped in the middle of the calculation. Also, as shown in FIG. 1, the route planning apparatus 1 includes a state information generation unit 2, a stop unit 3, and a route searching unit 4.

Of these, the state information generation unit 2 generates, every unit time, state information indicating the respective state of the moving bodies, in a search for routes (first routes) to target sites (goal points) corresponding to the respective moving bodies. The stop unit 3 stops generation of the state information if a condition for stopping generation of state information is satisfied. After generation of the state information is stopped, the state searching unit 4 searches for routes (second routes) to the target sites, based on state information generated before the state transitioned.

Note that the "condition" is the number of pieces of state information to be generated before stopping generation, or the time period from start to stop of generation of state information, or a condition including these two conditions.

In this manner, in the example embodiment, generation of state information is stopped based on a condition set in advance, and second routes to the target sites are searched for again, and thus, even if calculation is stopped in the middle of searching (in the middle of calculating the route plan), routes can be obtained.

Conventional route planning requires a long calculation time to obtain the optimized route plan, and thus is not practical. In contrast, in the example embodiment, even if route planning is stopped at any time, a solution with a certain degree of quality can be output at the time of the stoppage. In other words, even if the calculation time of route planning is short, routes can be obtained, though not optimal (total movement time is not minimized).

Accordingly, routes can be obtained at any timing, and thus it is practical. Note that more optimal routes can be obtained, the longer the calculation time of route planning.

Furthermore, an operation is also possible in which better routes are searched for while moving the moving bodies after setting the routes (second routes).

System Configuration

Figure 2:
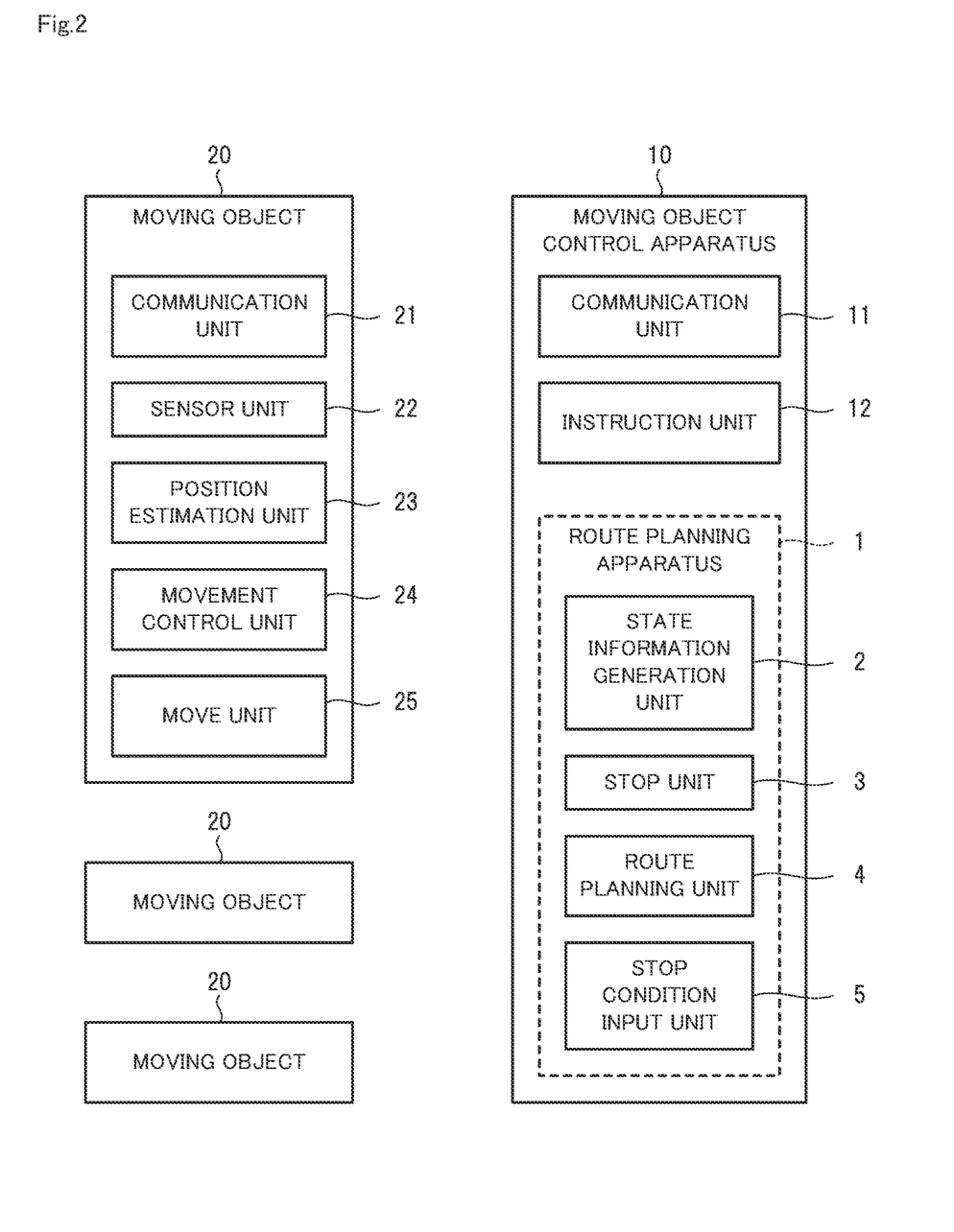
FIG. 2 is a diagram showing an example of a system (1) including the route planning apparatus.
Figure 3:
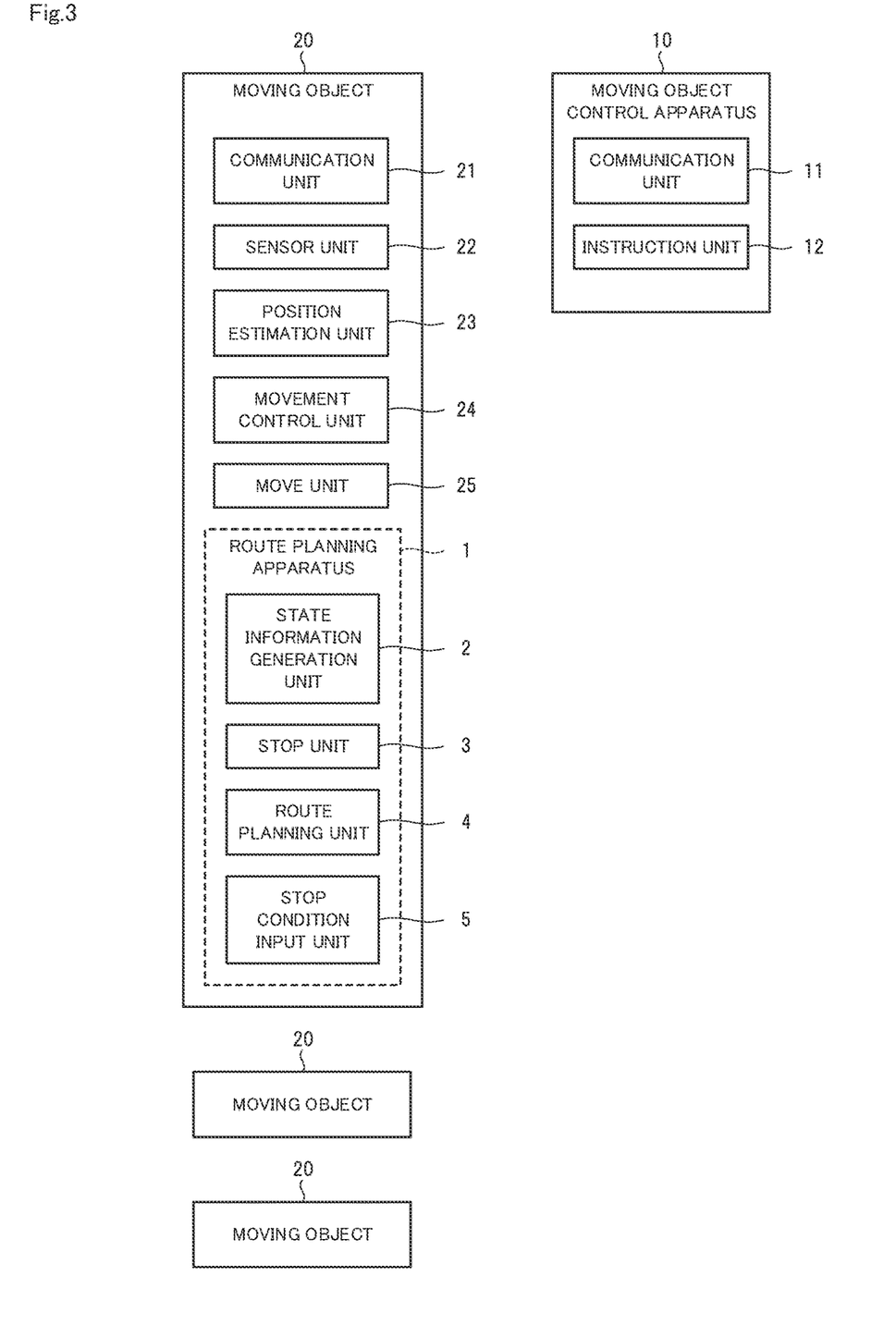
FIG. 3 is a diagram showing an example of a system (2) including the route planning apparatus.

Next, the configuration of the route planning apparatus 1 according to the example embodiment will be illustrated in more detail using FIG. 2 and FIG. 3. FIGS. 2 and 3 are diagrams respectively showing examples of systems (1) and (2) including a route planning apparatus. As respectively shown in FIGS. 2 and 3, the systems in the example embodiment include the route planning apparatus 1 and a plurality of moving bodies 20.

(1) Moving Object Control Apparatus Centered System

FIG. 2 shows a system in which the route planning apparatus 1 is provided in a moving object control apparatus 10. The moving object control apparatus 10 shown in FIG. 2 includes the route planning apparatus 1, a communication unit 11, and an instruction unit 12. Of these, the route planning apparatus 1 includes a stop condition input unit 5 in addition to the state information generation unit 2, the stop unit 3, and the route searching unit 4. The moving bodies 20 each include a communication unit 21, a sensor unit 22, a position estimation unit 23, a movement control unit 24, and a move unit 25.

(2) Moving Object Centered System

FIG. 3 is a system in which the route planning apparatus 1 is provided in a moving object 20. In the example in FIG. 3, one of the moving bodies 20 is set to the master, and the route planning apparatus 1 is provided in the moving object 20 serving as the master. The moving object control apparatus 10 shown in FIG. 3 includes the communication unit 11 and the instruction unit 12. The moving object 20 includes the route planning apparatus 1, the communication unit 21, the sensor unit 22, the position estimation unit 23, the movement control unit 24, and the move unit 25. Of these, the route planning apparatus 1 includes the stop condition input unit 5 in addition to the state information generation unit 2, the stop unit 3, and the route searching unit 4.

Note that a system configuration other than that of the systems (1) and (2) described above may also be used. Specifically, the state information generation unit 2, the stop unit 3, the route searching unit 4, and the stop condition input unit 5 may also be distributed between the moving object control apparatus 10 and the moving object 20. In this case, the communication content between the communication unit 11 and the communication units 21 is changed in accordance with the configuration content of the moving object control apparatus 10 and the moving object 20.

The moving object control apparatus will be described below.

The moving object control apparatus 10 controls the moving bodies 20 such that the moving bodies 20 move to respective target sites. Note that the moving object control apparatus 10 is an information processing apparatus such as a server computer, for example.

The communication unit 11 communicates with the communication units 21 of the moving bodies 20. Specifically, in the systems (1) and (2), the communication unit 11 transmits, to the moving bodies 20, instruction information indicating an instruction for moving the moving bodies 20 and the like. Also, in the system (1), the communication unit 11 receives, from each moving object 20, information such as positional information indicating the position of the moving object 20.

The instruction unit 12 gives an instruction used to move the moving bodies 20. Specifically, the instruction unit 12 generates instruction information indicating an instruction used to move the moving bodies 20 to the respective target sites, and transmits the instruction information to the moving bodies 20 via the communication unit 11.

The route planning apparatus 1 plans the routes (second routes) for moving the moving bodies 20 to the target sites. Specifically, the route planning apparatus 1 generates the route information indicating the routes (second routes) used when moving the moving bodies 20 to the target sites, using the positional information, map information, and target site information indicating the target site which each moving object 20 is to reach.

The map information is information indicating an arrangement plan of the target facility, and the like. The map information includes the routes on which the moving bodies 20 are to move, the target sites which the moving bodies 20 are to reach, and the like in a plant, logistics facility, or the like. Further, for example, a grid map is desirably used as the map information. Further, the map information is stored in a storage unit (not shown) provided in the moving object control apparatus 10, the moving bodies 20, or other locations.

Figure 4:
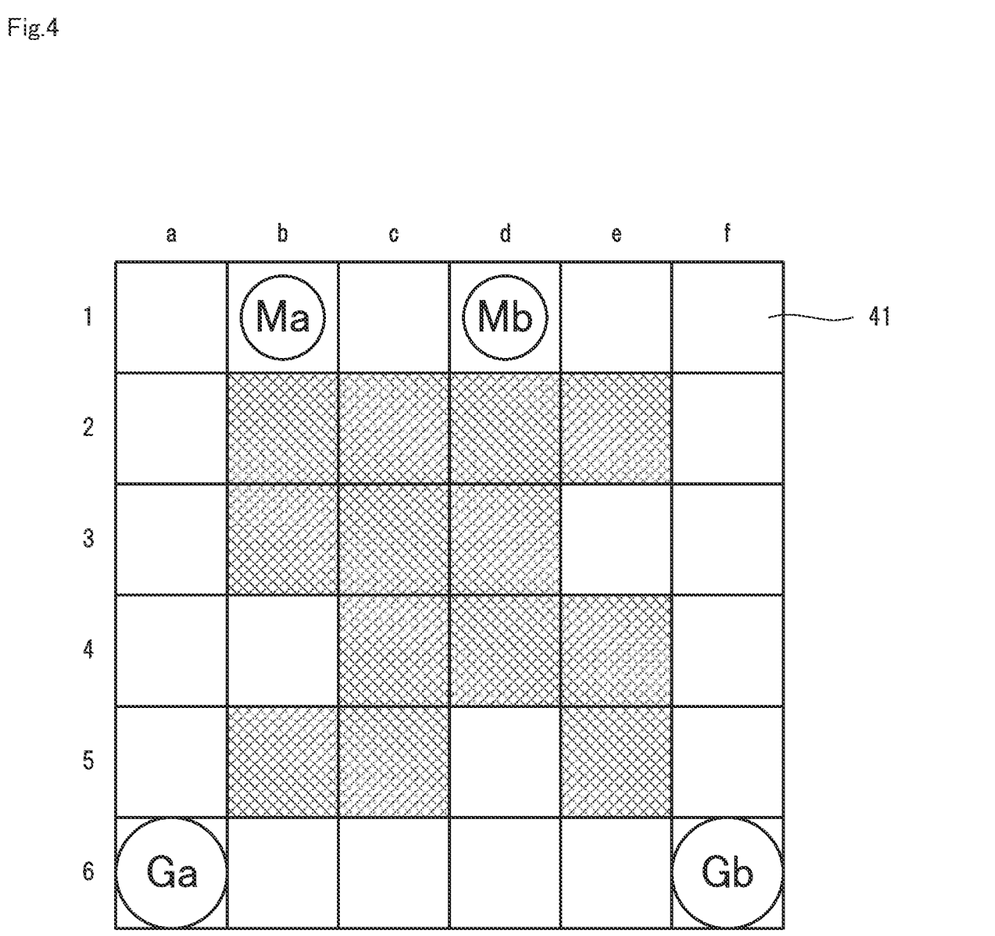
FIG. 4 is a diagram showing an example of a grid map.

FIG. 4 shows an example of a grid map. The moving bodies 20 (Ma) and (Mb), the target sites (Ga) and (Gb), and movement prohibited areas (hatched regions) are shown in the grid ranges 41 (hereinafter called "grids").

The moving bodies will be described below.

The moving bodies 20 obtain the instruction information from the moving object control apparatus 10 and move to the respective target sites. Specifically, the moving bodies 20 are conceivably AGVs, self-driving vehicles, self-flying vehicles, self-sailing ships, robots, and the like.

The communication unit 21 communicates with the communication unit 11 of the moving object control apparatus 10. Specifically, in the system (1), the communication unit 21 transmits the positional information and the like to the moving object control apparatus 10. Also, in the systems (1) and (2), the communication unit 21 receives, from the moving object control apparatus 10, the instruction information indicating the instruction for moving the moving bodies 20, and the like.

The sensor unit 22 is a sensor or the like for detecting the state of the moving object 20, objects (e.g., a tray, a shelf, etc.), signs assisting movement of the moving object 20, actual obstacles on the routes, and the like. Specifically, the sensor unit 22 includes one or more devices such as a radar, an ultrasonic sensor, an image capturing apparatus, a gyroscope, an encoder, and a GPS (Global Positioning System).

The position estimation unit 23 estimates the self-position of the moving object 20. Specifically, the position estimation unit 23 obtains measurement information indicating the measurement result of the sensor unit 22, estimates the self-position of the moving object 20 based on the obtained measurement information, and generates positional information.

The movement control unit 24 controls the move unit 25 that is provided in the moving object 20 and is for moving the moving object 20. Specifically, the movement control unit 24 controls the move unit 25 using the above route information to move the moving object 20 to the target site.

The move unit 25 is a device for moving the moving object 20. Specifically, if the moving object 20 is an electric vehicle, the move unit 25 is a means such as a motor, wheels, a battery, or the like that is necessary for moving the electric vehicle.

Figure 5:
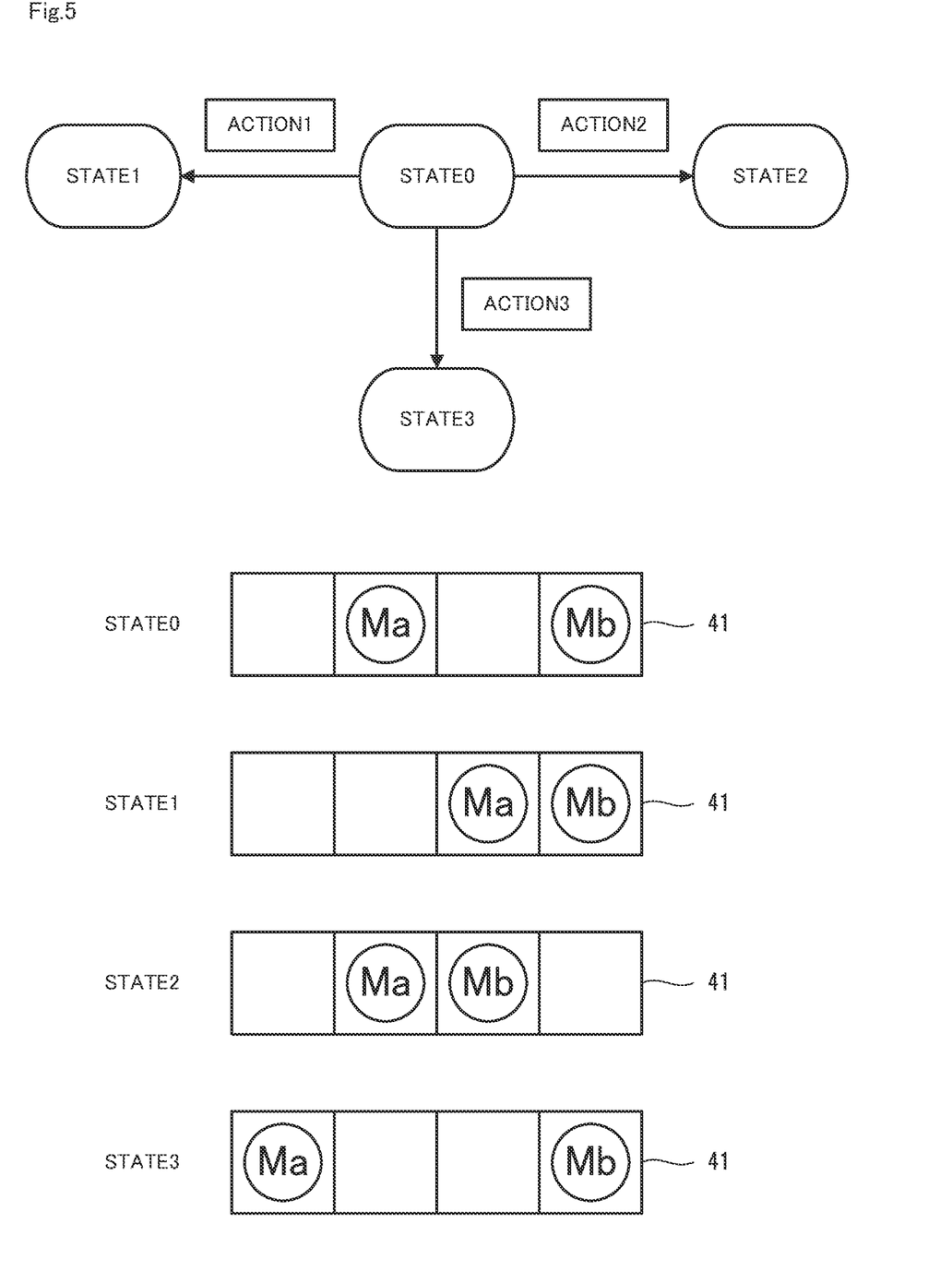
FIG. 5 is a diagram showing an example of generation of state information using the A*algorithm.
Figure 6:
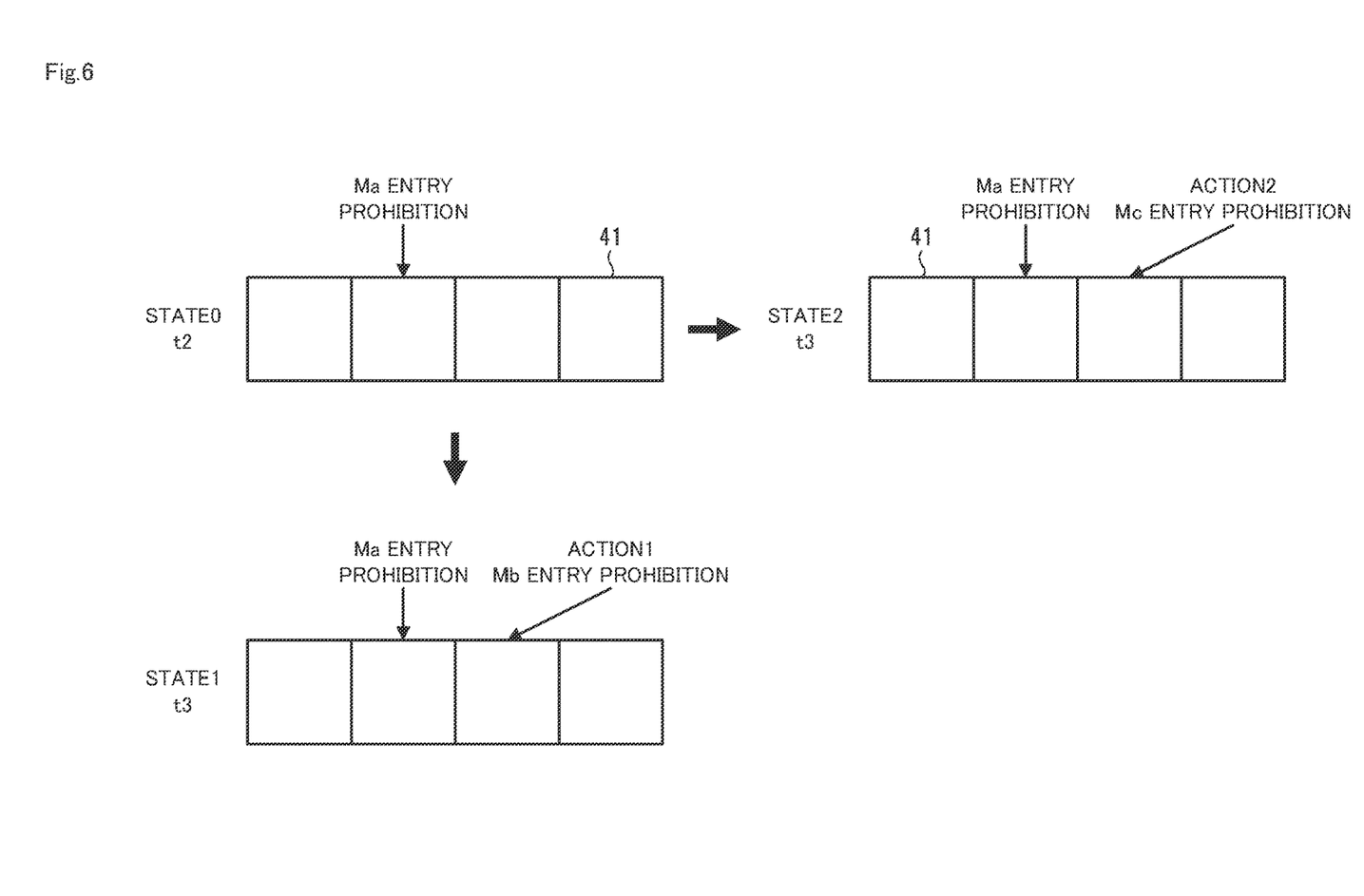
FIG. 6 is a diagram showing an example of generation of state information using the CBS algorithm.
Figure 7:
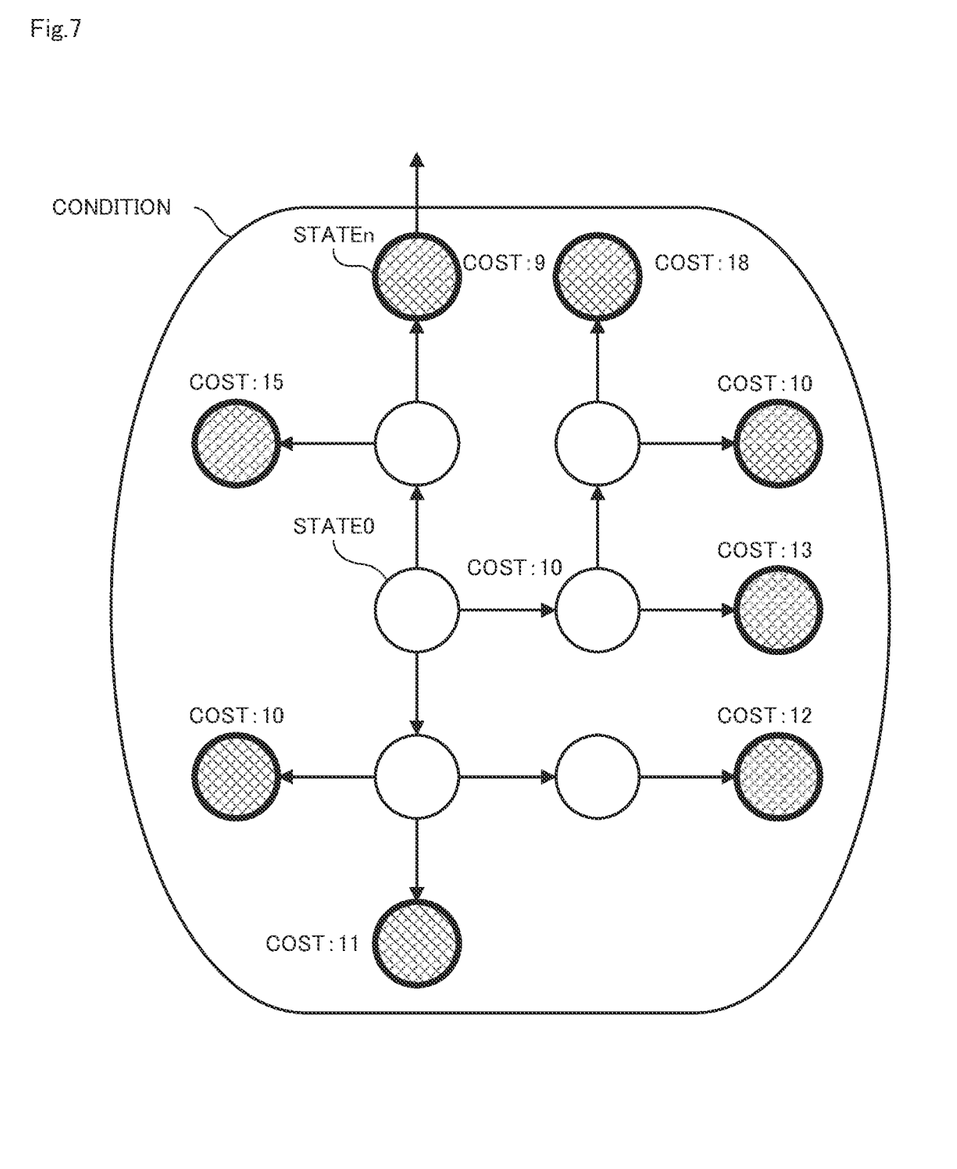
FIG. 7 is a diagram showing an example of stopping of generation of state information.

The route planning apparatus will be described below.
The route planning apparatus 1 will be described using FIG. 5, FIG. 6, and FIG. 7. FIG. 5 is a diagram showing an example of generation of state information using the A* algorithm. FIG. 6 is a diagram showing an example of generation of state information using the CBS algorithm. FIG. 7 is a diagram showing an example of stopping generation of state information.

The state information generation unit 2, every unit time, generates state information indicating the respective state of the moving bodies 20 in a search for the routes (first routes) to the target sites corresponding to the respective moving bodies 20. The unit time is a time period required for a moving object 20 to move to the next grid.

Specifically, the state information generation unit 2 searches for the routes (first routes) from the moving bodies 20 to the target sites using the optimization algorithm. The A*(A-star) algorithm, the CBS (Conflict-Based Search) algorithm, or the like is conceivably used as the optimization algorithm, for example.

Further, upon obtaining the instruction to stop generation of state information from the stop unit 3, the state information generation unit 2 stops generation of state information.

A case where the A* algorithm is applied will be described below.

In the A* algorithm, if the state is transitioned, and the state where all the moving bodies 20 have reached the respective target sites is detected in a plurality of states obtained as a result of the transition, the state information generation unit 2 retraces the states from the detected state, and generates the routes (first routes) using movement information (ACTION) corresponding to those states.

In other words, the state information generation unit 2 searches for the routes (first route) to the target sites using states as the state information (STATE) and the movement distance and movement direction of each of the moving bodies 20 as transition information (ACTION).

Specifically, as shown in FIG. 5, when the state (STATE0) is set as the base point, the states (STATE1, STATE2, and STATE3) are generated as the destinations of transitions (ACTION1, ACTION2, and ACTION3) from the state (STATE0). Note that in FIG. 5, the transition (ACTION1) represents the rightward movement of the moving object 20 (Ma), and the transition (ACTION2) represents the leftward movement of the moving object 20 (Mb), and the transition (ACTION3) represents the rightward movement of the moving object 20 (Ma).

A case where the CBS algorithm is applied will be described below.

In the CBS algorithm, the state information generation unit 2 searches for the routes (first routes) for the respective moving bodies 20 using the entry prohibited positions and additional entry prohibited positions of the respective moving bodies 20.

In other words, the state information generation unit 2 searches for the routes to the target sites using the state of the entry prohibited positions as the state information (STATE), and the additional entry prohibited positions for the respective moving bodies 20 as the transition information (ACTION).

Specifically, as shown in FIG. 6, in the case where the state (STATE0) at a time t2 is the base point, the states (STATE1, STATE2) are generated as the destinations of the transitions (ACTION 1, ACTION2) of the state (STATE0) at a time t3. Note that the transition (ACTION1) represents the entry prohibited position of the moving object 20 (Mb) at the time t3, and the transition (ACTION2) represents the entry prohibited positions of the moving object 20 (Mc) at the time t3.

Note that the A*+OD (A* with operator decomposition) algorithm may also be used as the optimization algorithm.

The stop unit 3 stops generation of state information when the condition for stopping generation of state information is satisfied. Specifically, the stop unit 3 stops generation of state information performed by the state information generation unit 2, based on the number of pieces of state information (STATE) to be generated before stopping generation, or the time period from the start to stop of generation of state information, or the condition including these two conditions.

FIG. 7 is a diagram showing a state where, when the state information generation unit 2 transitions the state with the state (STATE0) as the base point, the condition is satisfied, and thus the stop unit 3 has stopped the state information generation unit 2 transitioning the state.

In the initial state, the route searching unit 4 searches for initial routes (second routes) from the respective moving bodies 20 in the initial positions to the corresponding target sites using a polynomial algorithm. Further, after stopping generation of state information, the route searching unit 4 searches for the routes (second routes) to the target sites, based on the state information generated before the state transitioned. Thereafter, based on the searched routes (second routes), the route searching unit 4 calculates cost for each state information generated before the state transitioned, and selects state information to serve as the base point from the state information generated before the state transitioned, using the calculated cost.

Specifically, the route searching unit 4 searches for the routes (second routes) to the target sites using the polynomial algorithm. Note that the polynomial algorithm is an algorithm that can quickly calculate the routes even though the movement distance is not minimized (not the optimal solution).

The CA* (Cooperative A-star) algorithm is conceivably used as the polynomial algorithm, for example. The CA* algorithm is described in, for example, David Silver, "Cooperative pathfinding", In Proceedings of the First AAAI Conference on Artificial Intelligence and Interactive Digital Entertainment, AIIDE'05, pp. 117-122. AAAI Press. <URL: http://www0.cs.ucl.ac.uk/staff/D.Silver/web/Applications_files/coop-path-AIIDE pdf>.

Further, Parallel Push & Swap or the like may also be used as the polynomial algorithm.

Searching in the initial state will be described.

In the initial state, the route searching unit 4 searches for the routes from the respective moving bodies 20 to the corresponding target sites using the polynomial algorithm, and calculates the cost using the searched routes.

The cost is a value obtained by calculating, for the route of each of the moving bodies 20, the distance from the position of the moving object 20 to the corresponding target site, and totaling the distances calculated for each moving object 20, for example. The distance is represented using the number of grids on the route or the like, for example. Note that in the example of FIG. 7, the cost in the initial state (STATE0) is assumed to be 10.

Searching after stopping generation of state information will be described below.

If it is detected that the state information generation unit 2 has stopped generation of state information, the route searching unit 4 obtains the (undeveloped) states before the state transitioned from the states during stoppage. In other words, the route searching unit 4 obtains the states indicated by the hatched circles with bold lines shown in FIG. 7.

Subsequently, the route searching unit 4 searches for the routes (second routes) to the target sites for each of the obtained undeveloped states, using the polynomial algorithm.

Next, the route searching unit 4 calculates the cost for each state information generated before the state transitioned, based on the searched routes (second routes). In the example of FIG. 7, the cost is shown for each of the undeveloped states.

Subsequently, the route searching unit 4 selects state information to serve as the base point from the state information generated before the state transitioned, using the calculated cost. Specifically, the route searching unit 4 compares the cost in the initial state (STATE0) with the cost in each of the undeveloped states, and selects, from the undeveloped states, the state information with the minimum cost that is smaller than the cost in the initial state (STATE0).

In the example of FIG. 7, since the minimum cost among the undeveloped states is 9 and the cost in the initial state (STATE0) is 10, the state (STATEn) is selected. Note that states corresponding to a plurality of costs may be selected.

Further, in the case where the cost in each of the undeveloped states is greater than or equal to the cost in the initial state, the route searching unit 4 continues the initial state. Further, in the case where the minimum cost among the undeveloped states is the same as the cost in the initial state, the route searching unit 4 selects the state corresponding to one of the costs.

Note that the state information generation unit 2 sets the state information (STATEn) corresponding to the selected cost to the initial state, and generates the state information using the optimization algorithm.

The condition for stopping generation of state information is input to the stop condition input unit 5. Specifically, if the condition input by the user is not a predetermined condition set in advance, the stop condition input unit 5 prompts the user to re-input the condition. For example, if the input condition is the number of pieces of state information to be generated by the state information generation unit 2, and the input number is less than or equal to a predetermined value (a predetermined condition) set in advance, the stop condition input unit 5 causes an output device (not shown) to perform display prompting the user to make a correct input. Alternatively, if the input condition is the time for generating state information, and the input time is less than or equal to a predetermined time (a predetermined condition) set in advance, the stop condition input unit 5 causes the output device (not shown) to perform display prompting the user to make a correct input.

Apparatus Operations

Figure 8:
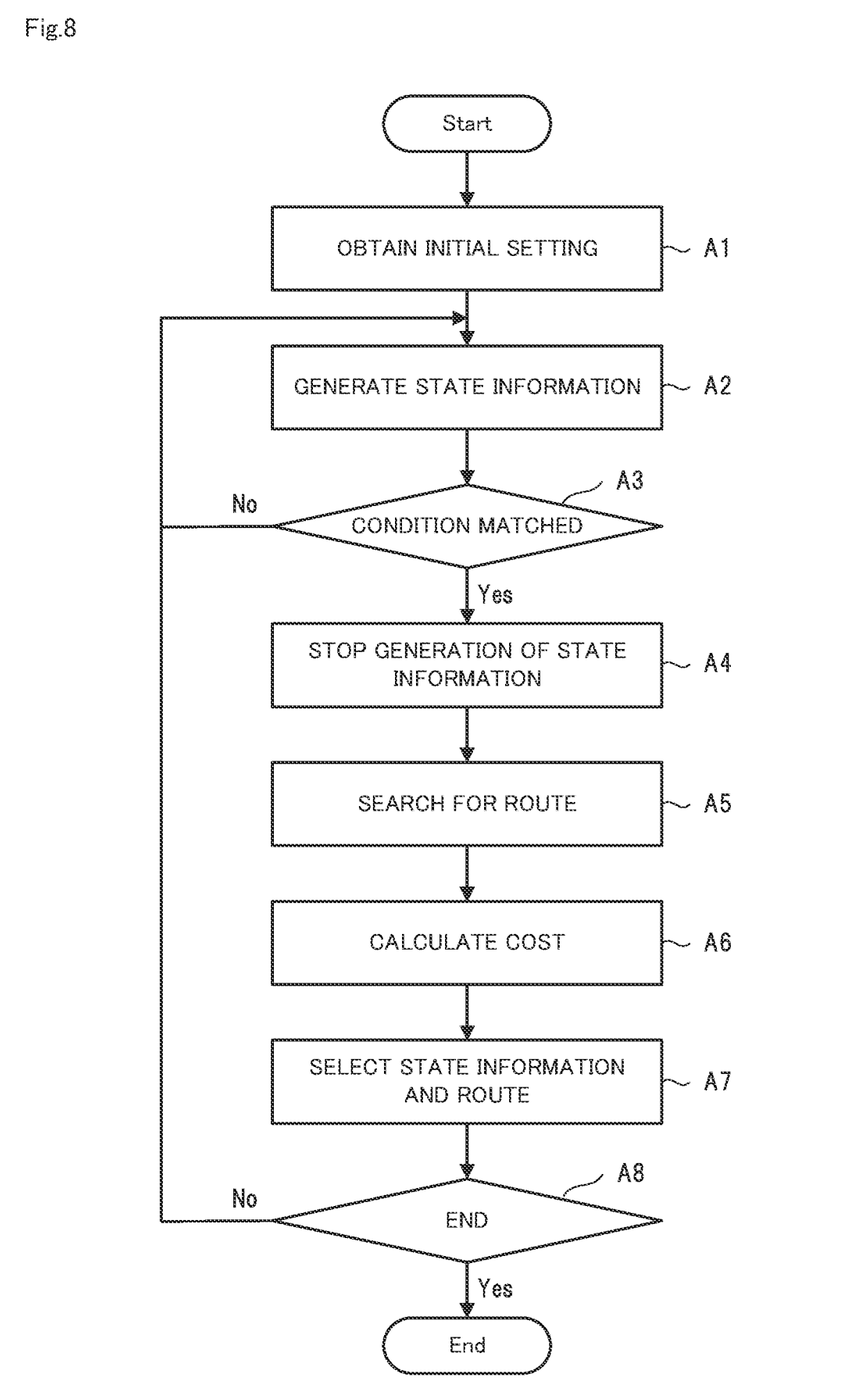
FIG. 8 is a diagram showing an example of an operation of the route planning apparatus.

Next, the operations of the route planning apparatus according to the example embodiment of the invention will be described using FIG. 8. FIG. 8 is a diagram showing an example of the operations of the route planning apparatus. In the description below, FIG. 2 to FIG. 7 will be referred to as appropriate. Also, in the example embodiment, the route planning method is implemented by operating the route planning apparatus. The description of the route planning method in the example embodiment will thus be given by describing the operations of the route planning apparatus as follows.

As shown in FIG. 8, first, the route planning apparatus 1 obtains the initial setting (step A1). Specifically, in step A1, the route searching unit 4, in the initial state, searches for the routes (second routes) from the respective moving bodies 20 in the initial positions to the corresponding target sites using the polynomial algorithm, and calculates the cost using the searched routes.

The cost is a value obtained by calculating, for the route of each of the moving bodies 20, the distance from the position of the moving object 20 to the corresponding target site, and totaling the distances calculated for each moving object 20, for example. The distance is represented using the number of grids on the route or the like, for example. Note that in the example of FIG. 7, the cost in the initial state (STATE0) is assumed to be 10.

Next, in a search for the routes to the target sites corresponding to the respective moving bodies 20, the state information generation unit 2 generates, every unit time, state information representing the respective states of the moving bodies 20 (step A2). The unit time is the time period required for the moving object 20 to move to the next grid.

Specifically, in step A2, the state information generation unit 2 searches for the routes (first routes) from the moving bodies 20 to the respective target sites using the optimization algorithm. The A* algorithm, the CBS algorithm, or the like is conceivably used as the optimization algorithm.

A case where the A* algorithm is applied will be illustrated below.

In step A2, the state information generation unit 2 searches for the routes (first routes) to the target sites, using states as the state information (STATE) and the movement distance and movement direction of each moving object 20 as the transition information (ACTION).

Specifically, as shown in FIG. 5, when the state (STATE0) is set to the base point, the states (STATE1, STATE2, and STATE3) are generated as the destinations of transitions (ACTION1, ACTION2, and ACTION3) of the state (STATE0). Note that in FIG. 5, the transition (ACTION1) represents the rightward movement of the moving object 20 (Ma), and the transition (ACTION2) represents the leftward movement of the moving object 20 (Mb), and the transition (ACTION3) represents the rightward movement of the moving object 20 (Ma).

A case where the CBS algorithm is applied will be described below.

In step A2, in the CBS algorithm, the routes (first routes) to the target sites are searched for, using the state of entry prohibited positions as the state information (STATE) and the additional entry prohibited positions for the respective moving bodies 20 as the transition information (ACTION).

Specifically, as shown in FIG. 6, in the case where the state (STATE0) at the time t2 is the base point, the states (STATE1, STATE2) are generated as destinations of the transitions (ACTION1, ACTION2) of the state (STATE0) at the time t3. Note that the transition (ACTION1) indicates the entry prohibited position of the moving object 20 (Mb) at the time t3, and the transition (ACTION2) indicates the entry prohibited positions of the moving object 20 (Mc) at the time t3.

Note that the A*+OD (A* with operator decomposition) algorithm may be used as the optimization algorithm.

Subsequently, the stop unit 3 stops generation of state information when the condition for stopping generation of state information is satisfied (step A3). Specifically, in the case where the number of pieces of state information to be generated, the time period from when state information is generated to when the generation is stopped, or these two conditions match the condition for stopping generation of state information (step A3: Yes), the stop unit 3 stops generation of state information of the state information generation unit 2 (step A4). On the other hand, if the number and/or the time period does not match the condition (step A3: No), the processing of step A2 is continued.

Subsequently, after generation of state information is stopped, the route searching unit 4 searches for the routes (second routes) to the target sites using the polynomial algorithm, based on the state information generated before the state transitioned (step A5). Note that the polynomial algorithm is an algorithm with which the routes can be quickly obtained although the movement distance is not minimized (optimized solution).

Specifically, in step A5, if it is detected that the state information generation unit 2 has stopped generation of state information, the route searching unit 4 obtains the (undeveloped) states before the state transitioned, from the states during stoppage. In other words, the route searching unit 4 obtains the states indicated by the hatched circles with bold lines shown in FIG. 7.

Next, in step A5, the route searching unit 4 searches for the routes (second routes) to the target sites for the respective undeveloped states thus obtained, using the polynomial algorithm.

Next, based on the searched routes (second routes), the route searching unit 4 calculates the cost for each state information generated before the state transitioned, and selects state information to serve as the base point from the state information generated before the state transitioned, using the calculated cost (step A6).

Specifically, in step A6, the route searching unit 4 calculates the cost for each piece of state information generated before the state transitioned, based on the searched routes (second routes). In the example of FIG. 7, the cost is shown for each undeveloped state.

Next, the route searching unit 4 selects state information to serve as the base point from the state information generated before the state transitioned, using the calculated cost, and the routes (second routes) corresponding to this state information (step A7).

For example, the route searching unit 4 compares the cost in the initial state (STATE0) and the costs in the respective undeveloped states, and selects, from the undeveloped states, the state information with the minimum cost that is smaller than the cost in the initial state (STATE 0).

In the example of FIG. 7, since the minimum cost among the undeveloped states is 9 and the cost in the initial state (STATE0) is 10, the state (STATEn) is selected. Note that states corresponding to a plurality of costs may also be selected.

If the costs in the respective undeveloped states are greater than or equal to the cost in the initial state, the route searching unit 4 continues the initial state. If the minimum cost among the undeveloped states is the same as the cost in the initial state, the route searching unit 4 selects the state corresponding to any one of the costs.

Next, If the route planning is to be ended (step A8: Yes), the route planning apparatus 1 ends the processing of step A2 to step A7. If the route planning is not to be ended (step A8: No), the processing transitions to step A2, the state information generation unit 2 sets the state information (STATEn) corresponding to the selected cost to the initial state (STATE0), and generates state information using the optimization algorithm.

Note that, when performing the initial setting in step A1, the condition for stopping generation of state information is input using the stop condition input unit 5. Specifically, if the condition is not a predetermined condition set in advance, the stop condition input unit 5 prompts the user to re-input the condition. For example, if the number of pieces of state information to be generated by the state information generation unit 2 is a threshold (predetermined condition) or less, or the time for generating state information is a threshold (predetermined condition) or less, the stop condition input unit 5 causes the output device (not shown) to perform display prompting the user to input a correct stop condition.

Effects of the Example Embodiment

In this manner, in the example embodiment, since generation of state information is stopped based on a condition set in advance and second routes to the target sites are searched for again, even if calculation is stopped in the middle of searching (in the middle of calculating the route plan), routes can be obtained.

In the example embodiment, even if the route plan is stopped at any time, a solution with a certain degree of quality can be output at the time of stopping. In other words, even if the calculation time of route planning is short, routes can be obtained even though the routes are not optimal (total movement time is not minimized).

Accordingly, routes can be obtained at any timing, and thus it is practical. Note that more optimal routes can be obtained, the longer the calculation time of route planning.

Furthermore, an operation is also possible in which better routes are searched for while moving the moving bodies after setting the routes (second routes).

Program

A program according to the example embodiment of the invention need only be a program that causes a computer to execute steps A1 to A8 shown in FIG. 8. The route planning apparatus and the route planning method according to the example embodiment can be realized by this program being installed in the computer and executed.

Specifically, in the system (1), a processor of the computer on the moving object control apparatus 10 side performs processing while functioning as the state information generation unit 2, the stop unit 3, the route searching unit 4, and the stop condition input unit 5. Further, in the system (2), a processor of the computer on the moving object 20 side performs processing while functioning as the state information generation unit 2, the stop unit 3, the route searching unit 4, and the stop condition input unit 5.

Also, the program of the example embodiment may also be executed by a computer system constituted by a plurality of computers. In this case, for example, each computer may function as any of the state information generation unit 2, the stop unit 3, the route searching unit 4, and the stop condition input unit 5.

Physical Configuration

Figure 9:
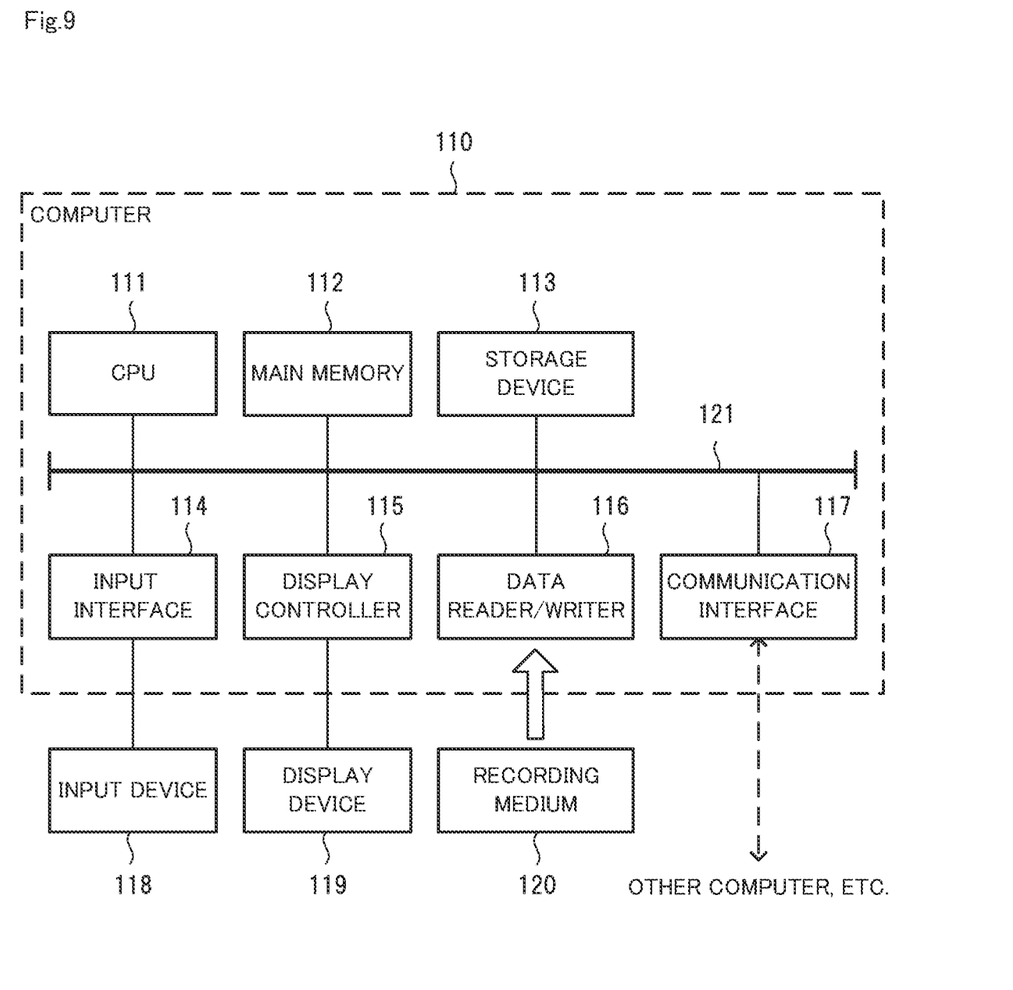
FIG. 9 is a diagram showing an example of a computer that realizes the route planning apparatus.

Here, a computer that realizes the route planning apparatus by executing a program of the example embodiments will be described using FIG. 9. FIG. 9 is a block diagram showing an example of a computer that realizes the route planning apparatus according to the example embodiment of the present invention.

As shown in FIG. 9, a computer 110 includes a CPU (Central Processing Unit) 111, a main memory 112, a storage device 113, an input interface 114, a display controller 115, a data reader/writer 116, and a communication interface 117. These constituent elements are connected to each other in a manner that enables data communication, via a bus 121. Note that the computer 110 may include a GPU (Graphics Processing Unit) or an FPGA (Field-Programmable Gate Array), in addition to the CPU 111 or instead of the CPU 111.

The CPU 111 implements various computational operations, by developing programs (code) in the example embodiment that are stored in the storage device 113 to the main memory 112, and executing these programs in a predetermined order. The main memory 112, typically, is a volatile storage device such as a DRAM (Dynamic Random Access Memory). Also, programs in the example embodiment are provided in a state of being stored in a computer-readable recording medium 120. Note that programs in the example embodiment may be distributed over the Internet connected via the communication interface 117.

Also, a semiconductor storage device such as a flash memory is given as a specific example of the storage device 113, other than a hard disk drive. The input interface 114 mediates data transmission between the CPU 111 and input devices 118 such as a keyboard and a mouse. The display controller 115 is connected to a display device 119 and controls display on the display device 119.

The data reader/writer 116 mediates data transmission between the CPU 111 and the recording medium 120, and executes readout of programs from the recording medium 120 and writing of processing results of the computer 110 to the recording medium 120. The communication interface 117 mediates data transmission between the CPU 111 and other computers.

Also, a general-purpose semiconductor storage device such as a CF (Compact Flash (registered trademark)) card or an SD (Secure Digital) card, a magnetic recording medium such as a flexible disk, and an optical recording medium such as a CD-ROM (Compact Disk Read Only Memory) are given as specific examples of the recording medium 120.

Note that the route planning apparatus 1 in the example embodiment is also realizable by using hardware that corresponds to the various parts, rather than by a computer on which programs are installed. Furthermore, the route planning apparatus 1 may be realized in part by programs, and the remaining portion may be realized by hardware.

Supplementary Notes

The following supplementary notes are further disclosed in relation to the above example embodiment. The example embodiments described above can be partially or wholly realized by supplementary notes 1 to 18 described below, although the invention is not limited to the following description.

Supplementary Note 1

A route planning apparatus including:
a state information generation unit configured to generate, every unit time, state information indicating a state of each moving object, in a search for a first route to a target site corresponding to the moving object;
a stop unit configured to stop generation of the state information when a condition for stopping generation of the state information is satisfied; and
a route searching unit configured to search for a second route to the target site, based on state information before the state transitioned, after generation of the state information is stopped.

Supplementary Note 2

The route planning apparatus according to supplementary note 1,
in which the state information generation unit searches for the first route from the moving object to the target site using an optimization algorithm.

Supplementary Note 3

The route planning apparatus according to supplementary note 1 or 2,
in which the route searching unit searches for the second route to the target site using a polynomial algorithm, with a position of the moving object after generation of the state information is stopped as a base point.

Supplementary Note 4

The route planning apparatus according to any one of supplementary notes 1 to 3,
in which the route searching unit calculates a cost for each state information generated before the state transitioned, based on the second route, and selects state information to serve as the base point from the state information generated before the state transitioned, using the calculated cost.

Supplementary Note 5

The route planning apparatus according to any one of supplementary notes 1 to 4, including:
a stop condition input unit configured to receive input of the condition for stopping generation of the state information.

Supplementary Note 6

The route planning apparatus according to supplementary note 5,
in which, if the condition is not a predetermined condition set in advance, the stop condition input unit prompts re-input.

Supplementary Note 7

A route planning method including:
(a) a step of generating, every unit time, state information indicating a state of each moving object, in a search for a first route to a target site corresponding to the moving object;
(b) a step of stopping generation of the state information when a condition for stopping generation of the state information is satisfied; and
(c) a step of searching for a second route to the target site, based on the state information generated before the state transitioned, after generation of the state information is stopped.

Supplementary Note 8

The route planning method according to supplementary note 7,
in which, in the (a) step, the first route from the moving object to the target site is searched for using an optimization algorithm.

Supplementary Note 9

The route planning method according to supplementary note 7 or 8,
in which, in the (b) step, a second route to the target site is searched for using a polynomial algorithm, with a position of the moving object after generation of the state information is stopped as a base point.

Supplementary Note 10

The route planning method according to any one of supplementary notes 7 to 9,
in which, in the (b) step, a cost for each state information generated before the state transitioned is calculated, based on the second route, and state information to serve as the base point from the state information generated before the state transitioned is selected, using the calculated cost.

Supplementary Note 11

The route planning method according to any one of supplementary notes 7 to 10, including:
(d) a step of inputting the condition for stopping generation of the state information.

Supplementary Note 12

The route planning method according to supplementary note 11,
in which, in the (d) step, re-input is prompted when the condition is not a predetermined condition set in advance.

Supplementary Note 13

A computer-readable recording medium that includes a program recorded thereon, the program including instructions that cause a computer to carry out:
(a) a step of generating, every unit time, state information indicating a state of each moving object, in a search for a first route to a target site corresponding to the moving object;
(b) a step of stopping generation of the state information when a condition for stopping generation of the state information is satisfied; and
(c) a step of searching for a second route to the target site, based on the state information generated before the state transitioned, after generation of the state information is stopped.

Supplementary Note 14

The computer-readable recording medium according to supplementary note 13,
in which, in the (a) step, the first route from the moving object to the target site is searched for using an optimization algorithm.

Supplementary Note 15

The computer-readable recording medium according to supplementary note 13 or 14,
in which, in the (b) step, the second route to the target site is searched for using a polynomial algorithm, with a position of the moving object after generation of the state information is stopped as a base point.

Supplementary Note 16

The computer-readable recording medium according to any one of supplementary notes 13 to 15,
in which, in the (b) step, a cost for each piece of state information generated before the state transitioned is calculated, based on the second route, and state information to serve as the base point is selected from the state information generated before the state transitioned, using the calculated cost.

Supplementary Note 17

The computer-readable recording medium according to any one of supplementary notes 13 to 16, further including:
(d) a step of inputting the condition for stopping generation of the state information.

Supplementary Note 18

The computer-readable recording medium according to supplementary note 17, the program further including an instruction that causes a computer to carry out:
in the (d) step, prompting re-input when the condition is not a predetermined condition set in advance.

Although the invention of the present application has been described above with reference to an example embodiment, the invention is not limited to the foregoing example embodiment. Various modifications apparent to those skilled in the art can be made to the configurations and details of the invention of the present application within the scope of the invention.

INDUSTRIAL APPLICABILITY

As described above, according to the invention, a route can be obtained even if calculation is stopped in the middle of calculating a route plan. The invention is useful in fields where moving bodies are required to be moved to target sites according to a route plan.

LIST OF REFERENCE SIGNS

1 Route planning apparatus
2 State information generation unit
3 Stop unit
4 Route searching unit
5 Stop condition input unit
10 Moving object control apparatus
11 Communication unit
12 Instruction unit
20 Moving object
21 Communication unit
22 Sensor unit
23 Position estimation unit
24 Movement control unit
25 Move unit
110 Computer
111 CPU
112 Main memory
113 Storage device
114 Input interface
115 Display controller
116 Data reader/writer
117 Communication interface
118 Input device
119 Display device
120 Storage medium
121 Bus

What is claimed is:

1. A route planning apparatus comprising:
one or more memories storing instructions; and
one or more processors configured to execute the instructions to:
perform search for a first route towards a target site from an initial position of a mobile object using A* (A-star) or CBS (Conflict-Based Search) as an optimization algorithm such that a current position of the mobile object is updated a plurality of first times until a condition has been satisfied; and
perform search for a second route to the target site from the current position of the mobile object at an end of the first route using CA* (Cooperative A-star) as a polynomial algorithm such that the current position of the mobile object is updated a plurality of second times by, for each of the plurality of second times:
calculating a cost associated with each of a plurality of possible transitions from the current position of the mobile object;
selecting one of the possible transitions based on the cost associated with each of the plurality of possible transitions that has been calculated; and
advancing the current position of the mobile using the selected one of the possible transitions.

2. The route planning apparatus according to claim 1, wherein the one or more instructions are configured to execute the instructions to further:
receive input of the condition.

3. The route planning apparatus according to claim 2, wherein the one or more instructions are configured to execute the instructions to further:
in response to the condition having not been prespecified, prompt for the input of the condition.

4. A route planning method comprising:
performing, by a processor, search for a first route towards a target site from an initial position of a mobile object using A* (A-star) or CBS (Conflict-Based Search) as an optimization algorithm such that a current position of the mobile object is updated a plurality of first times until a predetermined condition has been satisfied; and
performing, by the processor, search for a second route to the target site from the current position of the mobile object at an end of the first route using CA* (Cooperative A-star) as a polynomial algorithm such that the current position of the mobile object is updated a plurality of second times by, for each of the plurality of second times:
calculating a cost associated with each of a plurality of possible transitions from the current position of the mobile object;
selecting one of the possible transitions based on the cost associated with each of the plurality of possible transitions that has been calculated; and
advancing the current position of the mobile using the selected one of the possible transitions.

5. The route planning method according to claim 4, further comprising:
receiving, by the processor, input of the predetermined condition.

6. The route planning method according to claim 5, further comprising:
in response to the condition having not been prespecified, prompting, by the processor, for the input of the condition.

7. A non-transitory computer-readable recording medium including a program recorded thereon and that is executable by a computer to perform processing comprising:
performing search for a first route towards a target site from an initial position of a mobile object using A* (A-star) or CBS (Conflict-Based Search) as an optimization algorithm such that a current position of the mobile object is updated a plurality of first times until a predetermined condition has been satisfied; and
performing search for a second route to the target site from the current position of the mobile object at an end of the first route using CA* (Cooperative A-star) as a polynomial algorithm such that the current position of the mobile object is updated a plurality of second times by, for each of the plurality of second times:
calculating a cost associated with each of a plurality of possible transitions from the current position of the mobile object;
selecting one of the possible transitions based on the cost associated with each of the plurality of possible transitions that has been calculated; and
advancing the current position of the mobile using the selected one of the possible transitions.

8. The non-transitory computer-readable recording medium according to claim 7, wherein the processing further comprises:
receiving input of the predetermined the condition.

9. The non-transitory computer-readable recording medium according to claim 8, wherein the processing further comprises:

in response to the condition having not been prespecified, prompting, by the processor, for the input of the condition.

\* \* \* \* \*